(12) United States Patent
Hanckmann et al.

(10) Patent No.: US 9,554,081 B2
(45) Date of Patent: Jan. 24, 2017

(54) VIDEO ACCESS SYSTEM AND METHOD BASED ON ACTION TYPE DETECTION

(71) Applicant: NEDERLANDSE ORGANISATIE VOOR TOEGEPAST-NATUURWETENSCH APPELIJK ONDERZOEK TNO, Delft (NL)

(72) Inventors: Patrick Hanckmann, Delft (NL); Klamer Schutte, Delft (NL); Leo de Penning, Delft (NL); Gerardus Johannes Burghouts, Delft (NL)

(73) Assignee: NEDERLANDSE ORGANISATIE VOOR TOEGEPAST-NATUURWETENSCH APPELIJK ONDERZOEK TNO, Delft (NL)

( * ) Notice: Subject to any disclaimer, the term of this patent is extended or adjusted under 35 U.S.C. 154(b) by 213 days.

(21) Appl. No.: 14/013,682

(22) Filed: Aug. 29, 2013

(65) Prior Publication Data

US 2014/0105573 A1    Apr. 17, 2014

(30) Foreign Application Priority Data

Oct. 12, 2012    (EP) .................................... 12188420

(51) Int. Cl.
| | | |
|---|---|---|
| *H04N 5/91* | (2006.01) | |
| *G06K 9/46* | (2006.01) | |
| *G06K 9/00* | (2006.01) | |

(52) U.S. Cl.
CPC ............ *H04N 5/91* (2013.01); *G06K 9/00718* (2013.01); *G06K 9/4671* (2013.01)

(58) Field of Classification Search
CPC .............. G06K 9/00718; G06K 9/4671; G06K 9/00711; H04N 5/91
See application file for complete search history.

(56) References Cited

U.S. PATENT DOCUMENTS 5,684,715 A  *  11/1997  Palmer ......................... 348/473
6,411,724 B1 *   6/2002  Vaithilingam et al. ....... 382/100
(Continued)

OTHER PUBLICATIONS

Hanckmann, P., et al., "Automated Textual Descriptions for a Wide Range of Video Events with 48 Human Actions", ECCV—International Workshop in Video Event Categorization, Tagging and Retrieval, Oct. 7, 2012.

*Primary Examiner* — Gelek W Topgyal
(74) *Attorney, Agent, or Firm* — Husch Blackwell LLP (57) ABSTRACT

Descriptions of video segments for use to search or select video segments are generated by using a combination of video based action type detection and image based object detection. Action type detection results in detection of action types from a predetermined set of action types, with little or no information about actors involved in the action. Object detection results in detection of individual objects in the images, with little or no information actions. A set of rules is used that define one or more roles associated with action types and conditions on objects that can fill these roles. Detected action types are used to select rules and detected objects are assigned to roles defined the selected rule. Score values are computed for different assignments of detected objects to the role, as a function of the attribute values of the assigned objects. A combination of the detected action type and the detected objects is selected on the basis of the score values. A description of the video segment is generated from the selected combination.

13 Claims, 3 Drawing Sheets

(56) References Cited

U.S. PATENT DOCUMENTS

| | | | |
|---|---|---|---|
| 6,490,370 B1* | 12/2002 | Krasinski et al. | 382/195 |
| 7,143,434 B1* | 11/2006 | Paek et al. | 725/142 |
| 8,189,866 B1* | 5/2012 | Gu et al. | 382/103 |
| 8,842,965 B1* | 9/2014 | Song et al. | 386/230 |
| 2003/0161403 A1* | 8/2003 | Yang | 375/240.16 |
| 2003/0187950 A1* | 10/2003 | Rising, III | 709/218 |
| 2004/0130567 A1* | 7/2004 | Ekin et al. | 345/723 |
| 2005/0005308 A1* | 1/2005 | Logan et al. | 725/135 |
| 2005/0125223 A1* | 6/2005 | Divakaran et al. | 704/223 |
| 2007/0086664 A1* | 4/2007 | Kim et al. | 382/239 |
| 2007/0086665 A1* | 4/2007 | Kim et al. | 382/239 |
| 2007/0168864 A1* | 7/2007 | Yamamoto et al. | 715/716 |
| 2007/0192351 A1* | 8/2007 | Liu et al. | 707/102 |
| 2007/0279494 A1* | 12/2007 | Aman et al. | 348/169 |
| 2009/0060342 A1* | 3/2009 | Chiang et al. | 382/190 |
| 2009/0157680 A1* | 6/2009 | Crossley et al. | 707/6 |
| 2009/0219411 A1* | 9/2009 | Marman et al. | 348/231.99 |
| 2009/0274434 A1* | 11/2009 | Mei et al. | 386/52 |
| 2011/0099195 A1* | 4/2011 | Patwardhan et al. | 707/769 |
| 2011/0173235 A1* | 7/2011 | Aman et al. | 707/792 |
| 2011/0231419 A1* | 9/2011 | Papke et al. | 707/756 |
| 2012/0257048 A1* | 10/2012 | Anabuki et al. | 348/135 |
| 2013/0191752 A1* | 7/2013 | Lapierre et al. | 715/723 |
| 2013/0282747 A1* | 10/2013 | Cheng et al. | 707/758 |
| 2013/0325869 A1* | 12/2013 | Reiley et al. | 707/741 |

* cited by examiner

VIDEO ACCESS SYSTEM AND METHOD BASED ON ACTION TYPE DETECTION

PRIORITY

This application claims priority to EP 12188420.9, filed on Oct. 12, 2012, the entire content of which is incorporated by reference herein.

FIELD OF THE INVENTION

The invention relates to video access systems, such as video search engines and video surveillance systems, and to a video segment selection method.

BACKGROUND

Manual searching through video data can be very time consuming. In its simplest form, searching involves viewing video segments and jumping from one segment to the next. It has been proposed to speed up this process by means of automatic detection of image of interest in the video data. In edited video data such as motion pictures, detection of scene or shot changes can be used to select images of interest. Similarly, in continuous video detection of events like motion may be used to select images of interest. In video searching, images of interest can be used to identify key frames that can be used for faster selection of video segments. Similarly, in video surveillance point of interest detection can be used for generating alert signals for human supervisors.

Better focussed access to video data can be realized by means of pattern recognition techniques. For example, it is known to recognize objects, such as persons, in video images and to retrieve video segments based on a query that identifies an object that should be detected in the video segments. Another pattern recognition technique comprises automated detection and classification of actions that are visible in video data. Use of temporal aspects in the video sequence enables detection of distinctions between different types of action that cannot easily be distinguished on the basis of an individual image. Examples of detectable action types include simple motion, but also more specific actions throwing, catching, kicking, digging etc. Action detection may enable users to retrieve specific segments of video data by means of a database-like query that specifies an action type as search criterion.

Automated detection of specific actions such as throwing, catching, kicking, digging etc from video sequences is a complex pattern recognition task, which is not easy to program. Known action detection methods make use of a decision function that depend on detected local, low level time dependent video features derived from the video data. By setting parameters of the decision function to different values, decision functions are obtained that distinguish different types of action. For example, when support vector machine recognition is used, the parameters may include weight factors and a threshold used in a decision function, and components of a plurality of support vectors. Each support vector may contain a set of relative frequencies in a reference histogram of different feature values in a video sequence. Automated training is used for the selection of the parameter values, on the basis of detected features derived from training sequences, each in combination with a manually added identification of the type of action that is shown in the training sequence.

It has been found that such an automated training procedure can provide for reasonably reliable determination of actions type of actions that have been captured in video sequences. However, the results are limited to determination of the type of action. Training the system to determine additional features of the action would significantly increase the complexity of the training process and the number of exemplary video sequences, making training virtually unfeasible.

SUMMARY

Among others, it is an object to provide for more refined and/or more reliable selection of video segments.

According to one aspect a video access system according to claim 1 is provided. Herein separate action type detection and object detection from a video segment is used. Action type detection results in detection of action types from a predetermined set of action types, without information about actors involved in the action (or at least without complete information). Reasonably reliable action type detection can be ensured by training methods. Object detection results in detection of individual objects in the images, without information about the specific actions in which these objects are involved (or at least without complete information). The two types of detection are tied to each other by means of predetermined rules that are defined for individual action types. The rules define role or roles of actors involved in the action and conditions that have to be met by the attributes of the actors that fill the roles (as used herein actors can be persons as well as other objects). The rules and associated conditions may be defined by information stored in a storage device such as a processor memory, including information that, for each rule, indicates a role or roles and a way of computing score values from attribute values. In an embodiment, the rules may be defined by program code of a programmable processor, the program code being configured to make the processor compute the score values. A description generator uses a rule to select a combination of a detected action type with a detected object that is assigned as to a role, or detected objects that are assigned to different roles in the action. A plurality of such combinations may be generated and a selection may be made based on computed score values. The score values may be computed by verifying that attributes of the assigned objects, or object states expressed by these attributes have values specified by conditions that are part of the rule. More preferably, the score values may be computed by combining belief values related to estimates of probabilities from the action detector that an action of a detected type is visible and belief values related to estimates of probabilities from the object detector that attribute values or states of the detected objects are visible.

In this way, object detection can be used to increase the reliability of results obtained from action type detection. In addition, the rules may provide for the generation of searchable descriptions of the actions, which enables searching for video segments on the basis of queries that identify actions and/or actors in the searched video segments. Similarly, the rules may provide for the generation of alert signals when descriptions for incoming video match a query. In an embodiment the description is generated in the form of a string of searchable text. This makes it possible to search for video segments by means of known text search engines. Alternatively, the description in terms of structured database records may be used. This makes it possible to search for video segments by means of known database search engines.

In an embodiment, the description generator is configured to compute score values as a function of score values generated for the action type by the action type detector and/or for the detected object by the object detector. Thus a combination of score values, like belief values or probabilities, can be used to reinforce or reduce the score values for action types and/or objects based on image feature detection.

In an embodiment the selection of action types for use in the descriptions is not limited to selection of a single action type for a video segment, with the exclusion of other action types. The description generator may provide for the selection of a plurality of action types that apply to a same time range in the video segment. It has been found that a combination of different action types often applies to a same video segment simultaneously. It has been found that selecting more than one action type for use in the description provides for better search results.

BRIEF DESCRIPTION OF THE DRAWINGS

These and other objects and advantageous aspects will become apparent from a description of exemplary embodiments.

DETAILED DESCRIPTION OF EXEMPLARY EMBODIMENTS

Figure 1:
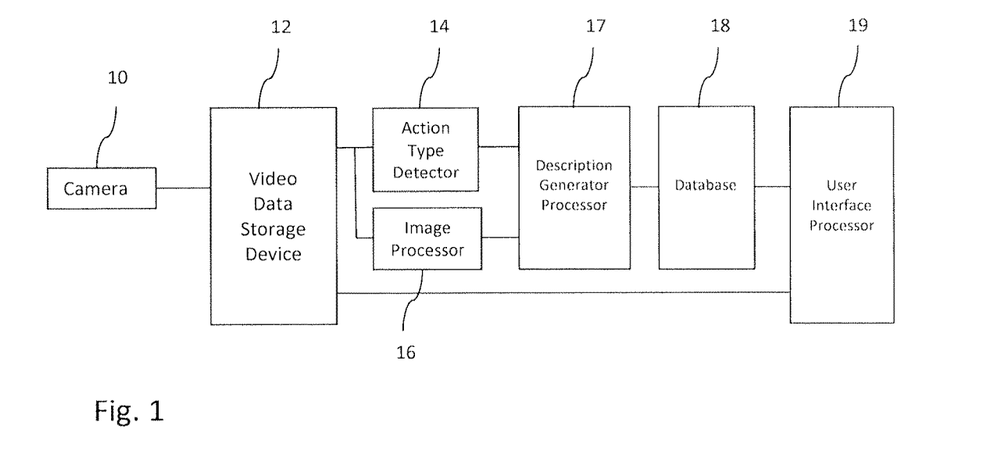
FIG. 1 shows a video access system

FIG. 1 shows an example of a video access system, comprising a camera 10, a video data storage device 12, an action type detector 14, an image processor 16, a description generator processor 17, a database 18 and a user interface processor 19.

Camera 10 is coupled to video data storage device 12. Camera 10 is configured to generate a stream of data that represents a temporal sequence of video images, which is stored by video data storage device 12. The data may represent the sequence of images in digitally compressed form (e.g. MPEG), camera 10 or video data storage device 12 comprising a video processor to perform compression. Although a single camera 10 and a single video data storage device 12 are shown by way of example, it should be appreciated that instead a plurality of storage devices and a plurality of cameras, coupled by a network may be used.

Action type detector 14 and image processor 16 have inputs coupled to video data storage device 12 for receiving the data stream or parts thereof. Alternatively, action type detector 14 and image processor 16 may receive the data stream directly from camera 10. Action type detector 14 and image processor 16 have outputs coupled to description generator processor 17. Description generator processor 17 has an output coupled to database 18. Although a single action type detector 14, image processor 16 and description generator processor 17 are shown, it should be appreciated that instead a plurality of action type detectors 14 and image processors 16 may be used, coupled to different camera's for example, or to different storage devices in a storage system.

User interface processor 19 is coupled to database 18 and video data storage device 12. Database 18 contains descriptions of video segments. Database 18 may contain records that identify segments of the video stream stored in video data storage device 12 or a system of such storage devices, in association with identifications of action types of actions that have been detected in the segments, identifiers of actors participating in the actions and further parameters associated with the actions. In an embodiment, each record may contain an identification of a video segment and a textual description of the video segment, which allows for searching by means of conventional text search engines. Database 18 may comprise a storage device with storage space for storing database records.

Action type detector 14, image processor 16, description generator processor 17, and user interface processor 19 may be implemented by means of one or more programmable computers and computer programs for these computers. Different computers may used for each, or one or more may be implemented by executing different programs on the same computer. Computer executable instructions of the computer program may be supplied from a computer readable medium like a magnetic or optical disk or a semiconductor memory.

Action type detector 14 is a device that detects which of a predetermined set of action types is seen to occur in a time range in a video stream (i.e. in a video segment of temporally successive images in the stream), or at least computes belief values such as likelihood values that an action of such a type is seen to occur. In one example, the set of action types includes the action types of approach, arrive, attach, bounce, bury, carry, catch, chase, close, collide, dig, drop, enter, exchange, exit, fall, flee, fly, follow, get, give, go, hand, haul, have, hit, hold, jump, kick, leave, lift, move, open, pass, pickup, push, put-down, raise, receive, replace, run, snatch, stop, take, throw, touch, turn, and walk. In particular, an action type detector 14 may be a device that derives detections of spatially and temporally localized features from a video sequence. "Localized" means that the feature depends on image content in a limited range of spatial and temporal positions (pixel positions and successive images). In order to detect action type, the features include features whose detection depends on temporal change. An action type detector 14 may compute belief values from the detected features. Image processor 16 is used as an object detector. An object detector is a device that detects objects in an image at a time point or images in a time range. In an embodiment the object detector is a device that detects which of a predetermined set of object types are seen to be present in an image. In particular, an object detector may be a device that derives detections of spatially localized features from an image. Features may include features whose detection depends on spatial image content change. Alternatively, the object detector may make use of detection of image regions with homogeneous image properties, the regions being identified with objects. Other known image based object detection methods may be used as well.

Figure 2:
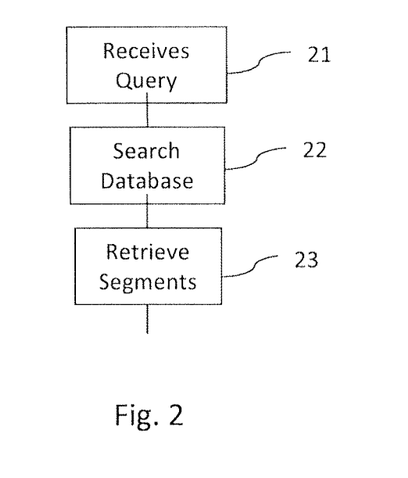
FIG. 2 shows a method of accessing video segments
Figure 3:
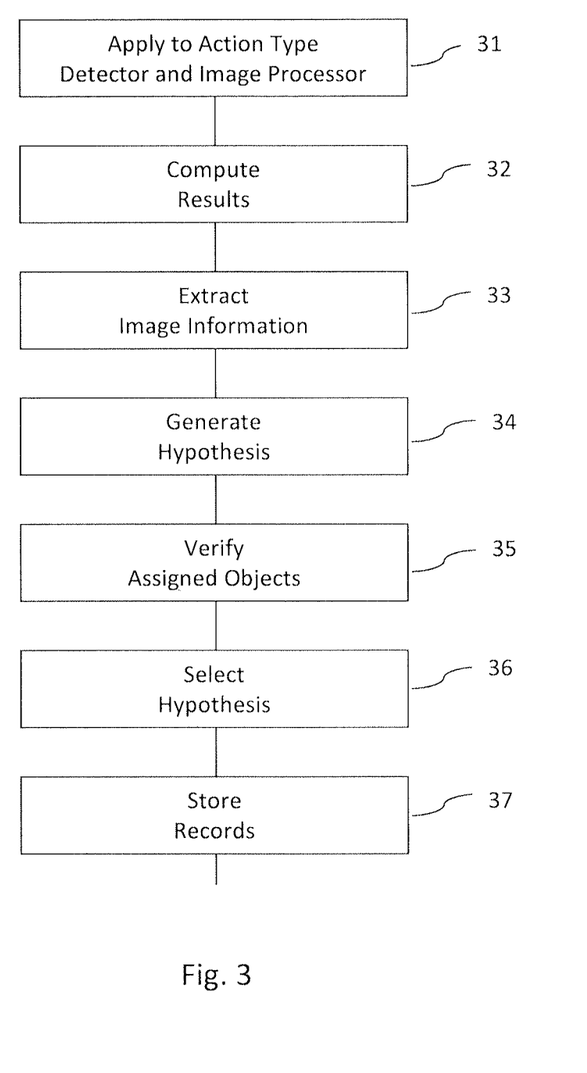
FIG. 3 shows a method of generating descriptions

FIG. 2, 3 show flow charts of operation of the video access system. FIG. 2 shows a flow chart of a video access process. By way of example a process of retrieval of video segments on the basis of queries is shown. In a first step 21 of this process, user interface processor 19 receives a query for an action. In a second step 22 of this process, user interface processor 19 searches database 18 for records matching the query. When the records contain textual descriptions, a search engine for searching through the textual descriptions may be used.

The records of database 18 enable user interface processor 19 to retrieve identifications of segments of the video stream for which the associated data, such as action type, actors and/or further parameters in database 18 matches the query.

In a third step 21 of the process, user interface processor 19 uses the retrieved identifications of the segments of the video stream to retrieve the identified segments from video data storage device 12. Images from the retrieved segments may be displayed on a display screen (not shown). Although an example of retrieval of video segments on the basis of queries is shown, it should be appreciated that alternatively other types of video access process may be used. For example, user interface processor 19 may provide for an alert generation process, wherein an alert signal is generated, and/or video is selectively displayed in response to generation of a record that results in a match with a query.

FIG. 3 shows a flow-chart of construction of database records for video segments. In a first step 31, a video segment is applied to action type detector 14 and image processor 16. In a second step 32, action type detector 14 computes detection results, such as a likelihood value and/or a yes/no detection whether or not an action of one of a number of predetermined action types is visible in the video segment. Action type detector 14 may do so for a plurality of predetermined types of actions, such as burying, catching, digging, dropping, exchanging, falling, etc. In an embodiment an action type detector 14 is used that is configured to detect for each of a plurality of action type whether they are shown in the same segment, making it possible that more than one type of action is detected for the same segment. Action type detector 14 supplies detection results to description generator processor 17. In a third step 33, image processor 16 extracts image information from the video segment, the extraction of image information may comprise object detection, determination of features of detected objects and/or determination of a track of positions of an object in successive images. In embodiment, third step 33 comprises using the extracted object descriptions to generate of event descriptions. Image processor 16 supplies extraction results to description generator processor 17.

Description generator processor 17 makes use of hypotheses. As used herein a hypothesis is an information object that connects detected actions to detected objects. For example a hypothesis may connect a detected "chase" action to a chasing object (e.g. a person or a vehicle) and an object (e.g. a person or a vehicle) being chased. Description generator processor 17 uses rules that define templates of the hypotheses. Each template is associated with a specific type of action and the template has fields (placeholders) for inserting (properties of objects that fill roles in the action. Each field is associated with a different predefined role. Furthermore, a rule defines one or more conditions in terms of the objects that are assigned to the roles, and/or the properties or state of these objects.

An example of a rule is a template for an action type "chase", which has two fields for objects that fill different roles in the action: a chasing object (labeled E1) and an object being chased (labeled E2). In this example the conditions associated with the template may be     condition(1)=object(E1) moving at time(T1)
    condition(2)=object(E2) moving at time(T2)
    condition(3)=object(E1) is a person or vehicle
    condition(4)=object(E2) is a person or vehicle
    condition(5)=time(T1) and time(T2) overlap
    condition(6)=the position of object(E2) is in an area from the position of object (E1) along the direction of motion of object (E1) at time (T1)
    condition(7)=the direction of motion of object(E2) is away from the position of object (E1) at time (T1)

In the rule, (E1), (E2), (T1) and (T2) stand for fields (variables) to which concrete objects and time (range) values can be assigned. Such objects and values are selected from detected objects when the rule is applied. Although the conditions have been expressed verbally for the sake of clarity, it should be appreciated that in practical implementation they are expressed in terms of results produced by image processor 16. For example, image processor 16 may be configured to detect objects in the images of the video sequence and to extract a track, i.e. positions values as a function of time. In this case, when the rule is applied, "object (E1) moving at time (T1)" is evaluated as a condition on the differences between the positions in the track of an assigned object E1 detected in the images by image processor 16 that has been assigned to a field of the template.

The rule may be defined by information stored in a storage device such as a computer memory. In one embodiment description generator processor 17 may be configured to read this information and to allocate storage locations (fields) associated with roles in response to the information, to store identifications of objects or attributes of such objects in the fields, or to associate objects with identifiers defined by the information. Similarly description generator processor 17 may be configured to compute score values from attributes of the objects under control of information in the storage device. In an embodiment, the rules may be expressed as machine executable program code for description generator processor 17, to make description generator processor 17, for each rule, assign an object or objects to the role or roles and compute score values from attributes of the object or objects.

Description generator processor 17 generates one or more hypotheses by using available detected actions from action type detector 14 to select rules with associated templates and available detected objects from image processor 16 to associate objects with the fields of the templates. Here the term "hypothesis" refers to generated information that serves to assign an object or objects to a role or roles defined by one of the predetermined rules. Preferably, at least one rule is provided for each action. More than one alternative rule may be provided for a same action.

In an embodiment, action type detector 14 and/or image processor 16 are configured to compute belief values for the detection results (also called likelihood values, e.g. estimated probabilities that sequence of images indeed shows the detected action and/or that the images indeed show the detected object and/or probability distributions for the feature values of the objects). In this embodiment the belief values may be used to compute a belief values for the hypothesis.

In a fourth step 34, description generator processor 17 generates hypotheses, by using detected actions from action type detector 14 to identify rules and by inserting detected objects in the fields of a template associated with the rules. A plurality of hypotheses may be generated, if a plurality of actions and/or a plurality of objects has been detected. Although the process will be described for an embodiment wherein all hypotheses are generated at the outset, it should be appreciated that alternatively the hypotheses may be generated sequentially and processed one by one. For example, different hypotheses may be generated sequentially by sequentially selecting different detected actions and their associated rules and sequentially selecting different detected objects for the fields in the template. In this embodiment, the process may loop through repetitions of the following steps.

In a fifth step 35 description generator processor 17 verifies that the assigned objects satisfy the conditions from the rule or generator processor 17, which may be used to produce a score value that indicates whether the hypothesis is true or false, dependent on whether all conditions are met or not. Alternatively, a score value may be generated that expresses a more gradual transition between true and false. The score value for a hypothesis may be an estimated probability that the hypothesis is true, a logarithm of such a probability or a belief value (i.e. a value that generally changes in one direction with increases of the probability). A formula of the following type may be used to compute the belief value B for a hypothesis:

$$B=w0*B(A,t)+\text{Sum}\{w(i)*B(\text{condition},t(i))\}$$

Herein w0 is a predetermined weight value associated with the action part of the hypothesis. B(A, t) is a belief value (e.g. an estimate of the probability) that an action of type A has occurred at a time t, or a belief value for this, as generated by action type detector 14. The sum is taken over the conditions of the hypothesis, with predetermined weights w(i) for the individual hypotheses. A condition may require that an attribute has a specified value, or the object has a specified state. In this case B(condition, t(i)) may be a belief value that the attribute of the object has the specified value and/or the object has the specified state (e.g. an estimate of (the logarithm of) the probability that the object is in the specified state at a time t(i)), as generated by image processor 16. The rule may express t(i) relative to "t", e.g. in terms of equality or a predetermined offset.

In a sixth step 36 description generator processor 17 selects hypotheses based on the computed score values. If score values are used that are either have the value false or true, all hypotheses with score value "true" are selected. When score values are used that may have one of more than two values, the score values may still be used for selection. In one embodiment a predetermined number N of hypotheses with the highest scores B may be selected (higher than the score B of any unselected hypotheses). In another embodiment all hypotheses having a belief value B higher than a predetermined threshold T may be selected.

In a seventh step 37 description generator processor 17 stores records with data values derived from the selected hypotheses in database 18. In an embodiment, this comprises generating a textual description from each of the selected hypotheses, as defined by the template and storing the textual description with an identifier of a video segment in the action of the hypothesis has been detected, the identifier providing information, such as an address, to enable retrieval of the video segment.

In an embodiment, each template defines a sentence of text with fields wherein information from image processor 16 may be inserted. For the chase action, for example the template may define a sentence "<field for role1> chases <field for role2>". Description generator processor 17 may be configured to retrieve terms for insertion in the fields, based predetermined associations of these terms with detected object types detected by image processor 16 and/or feature values extracted by image processor 16. For example, if image processor 16 has visually detected a object of the type "car" with a color feature "red" and assigned it to the role of "chasing object" and furthermore an object of the type "person" has been detected and assigned to the role of "chased object", description generator processor 17 may retrieve the words associated with these object detection results and insert "a red car" and "a person" in the template for "chase", resulting in a sentence "a red car chases a person". As will be appreciated, different types of object feature values may be associated with different words.

In another embodiment the descriptions may be more structured database records. For example, a description record may be a tuple (video segment ID, action code, ID of actor with role1, ID of actor with role 2). Herein the actor IDs may be references to further records for detected objects, the further records containing extracted feature values of the detected objects from image processor 16, such as bounding box dimensions, contour data track of positions, a color histogram, etc). In this case the description generator processor 17 adds a description record in database 18 with inserted values in the fields, for use in searches as shown in FIG. 2.

The various steps will be discussed in more detail. The aim of the action type detector is to recognize action types (verbs) that are used for the description generator. The Random-Forest Tag-Propagation (RF TP) may be considered, which is known per se. The RF TP classifier [11] is a rule-based classifier which learns its rules from an abundant set of decision trees (i.e. a random forest) [22]. In order to deliver a list of actions with their probability, the similarity distributions over the actions is calculated [23]. The core of the RF TP method is that it models the probability of a verb (in a video) as a consequence of the similarities with all of the previously seen videos and the actions that are active in those. The training of the RF-TP is described in [11]. The RF TP outputs a vector containing a belief value for each action present in the video. The RF method provides for a way of assigning feature values to discrete histogram bins (i.e. quantization). Instead of RF other quantization (binning) methods may be used. As an alternative to the RF TP detector an RBS based detector may be used, as will be described for description generator processor 17.

Description generator processor 17 (also referred to more briefly as "description generator") may be implemented as a Rule Based System (RBS) classifier. World knowledge is used coded in rules. The rules are essentially a set of conditions. The conditions are based on the beliefs and relations as generated by the event description. Another example of an event descriptor for a "chase" action is action=chase
  condition(1)=object(E1) moving at time(T1)
  condition(2)=object(E2) moving at time(T2)
  condition(3)=object(E1) is a person
  condition(4)=object(E2) is a person
  condition(5)=time(T1) and time(T2) overlap In the example, E1, T1, etc. are placeholders for actual entity identifiers and timestamps (or time range stamps). As more than one entity can be present at any time, and as actions might happen multiple times by one or different entities, the RBS builds multiple hypotheses. A belief value of the action is calculated by taking the sum of the beliefs of the triggered conditions (and if the condition is not triggered, its belief is zero), divided by the maximum possible performance:

$$B(\text{hypothesis})=\_B(\text{conditions})\text{number of conditions.}$$

In an embodiment, the belief is computed from a weighted sum of terms $$B=w0*P(A,t)+\text{Sum}\{w(i)*P(\text{condition},t(i))\}$$

Herein w0 is a predetermined weight value associated with the action part of the hypothesis. P(A, t) is an estimate of the probability that an action of type A has occurred at a time t, or a belief value for this, as generated by action type detector 14. If an action type detector 14 is used that merely detects events as a yes/no decision, the first term may be omitted. The sum is taken over the conditions of the hypothesis, with predetermined weights w(i) for the individual hypotheses. P(condition, t(i)) is an estimate of the probability that a specified condition from the event descriptor on the properties of an object has occurred at a time t(i), or a belief value for this, as generated by image processor 16. If an image processor 16 is used that merely returns property values for detected objects, the probability that the object is present, as generated by image processor 16, may be used instead of the probability. If an image processor 16 is used that merely returns a detection of an object and values of its properties, a predetermined value may be used instead of the probability. The use of probabilities allows for an inexact match between the rules and noisy input data.

The RBS can be applied as description generator due to the generative properties and the structure of the rules which connects entities and objects to actions. When applied as a description generator the RBS builds the hypotheses and selects for every rule the hypothesis with the highest belief value.

In an embodiment, description generator processor 17 makes a selection among the rules (and their top hypothesis) based on the actions classified by the action classifier. For every action description generator processor 17 selects a rule that represents that action. Then, from the list of actions the description generator selects a number of actions based on: (1) the action probability, (2) the hypothesis score generated by the RBS, and (3) if an entity or object is present in the best hypothesis (which implies that the action is connected to an entity or object). For the selected actions, description generator processor 17 uses the hypothesis to extract the subject and objects. The actions are used as the verbs in a textual description or as value in an action field of a record. A sentence of textual description is considered to at least contain a subject and a verb (e.g. person E1 catches), and a record with fields for values identifying a subject and a verb may be used. However, the rule can also provide the direct and indirect object (e.g. person E1 catches object E2), and a record with a field for values identifying the direct and/or indirect object may be used. Additionally the hypothesis provides temporal information for the action, which may be stored in a time field of the record. The temporal information can be used to order the actions in time. In an embodiment, a compact sentence is generated for each action using a template filling approach. The template provides information about what prepositions are used in combination with specific verbs, the order of the words in the sentence, and the conjugation of the verbs. During search, a query may be matched with the compact sentences of different video segments.

The description generator was evaluated experimentally on 241 short video segments (also referred to as "videos"). For all videos a ground truth was available. In the experiment, the ground truth consists of 10 sentences per video, written by 10 different people. Some ground truths contained complex sentences (such as Ground truth examples: "A man catches a box that is flying through the air". "The person caught the box". "Man catches box flying through the air") and therefore describe multiple actions. Per video at minimum 1, at maximum 10, and at average 4.9 different actions were present in the ground truth.

In the experiment, for each ground truth sentence we extract the verb, subject, and object(s), using the Stanford Natural Language Parser [24,25]. The subject and objects are labeled with one of the four categories: person, car, bike, or other. The description generator constructs a sentence containing a verb and subject, and (if detected) a direct and indirect object. Its subject and objects are also labeled with one of the four categories. The experiment compares the following action classifier-description generator combinations: RBS+RBS, and the RF TP+RBS. Both setups of the description generator use the same event description data. The RBS+RBS uses the RBS both for action classification and description generation. The RF TP+RBS uses the RF TP to classify actions and the RBS to generate descriptions. For the RF TP+RBS the rule set was optimized to gather information about the subject and objects to generate a sentence. For the RBS+RBS setup the rule set was optimized for the classification of actions.

We calculate two performance measures: a union and a percentage score. For each clip we compare the ground truth sentences to the generated sentences. The clip's union score is the best match for all sentence pairs (i.e. the percentage of clips where there is at least one agreement between ground truth and generated sentences); its percentage score is the mean match corrected for the minimum number of the amount of ground truth sentences and the amount of generated sentences (i.e. the agreement between the sets of ground truth and generated sentences). We report the average over all clips, for verbs, subjects and objects as well as an overall score (the overall score is the mean of the verb, subject and object scores).

The performance for both the RBS+RBS and RF TP+RBS is given in table 1.

TABLE 1

Performance of the description generator

| Score | Overall | Verb | Subject | Objects |
|---|---|---|---|---|
| union | 61.6% | 86.1% | 52.3% | 51.7% |
| percentage | 25.4% | 38.6% | 18.6% | 18.9% |
| union | 68.3% | 92.3% | 62.0% | 67.8% |
| percentage | 40.4% | 59.3% | 30.5% | 31.5% |

Both on union and the percentage score we see the better performance for the RF TP+RBS compared to the RBS+RBS, supported by an increase for the descriptions' Verb, Subject and Object components.

The performance gain for the verb classification on the union score is 6.2%, thus more correct verbs have been reported by the RF TP+RBS. For the percentage score the improvement is 20.7%, so we also have an improved accuracy of the classified verbs.

The performance on the subjects increased as well for both the union and the percentage score, with resp. 9.7% and 11.9%. Every generated sentence does at least contain a verb and a subject. The performance gain of the subject score is less than the verbs performance gain, while it would be expected to be similar or higher. Both the object and the subject score suffer from too restrictive threshold on the person, car and bike detectors leading to many entities labeled 'other'.

The performance on the objects increased for the union and the percentage score by 16.1% and 12.6%. It shows that the RF TP+RBS is better in detecting and connecting the direct and indirect objects in a video. The results show that the discriminative bag-of-features based RF TP is better used as verb classifier than the RBS when creating descriptions. Although [13] already showed that the RF TP is a good stand alone verb classifier, here we see it also performs well when applied to a description task. Even though the RF TP classifier is not optimized for the description generator (e.g.

the set of frequently occurring actions may be different) we conclude that a dedicated action classifier improves the performance significantly.

The experiments show that a dedicated action classifier in addition to a description generator improves the description performance significantly. Although not perfect, a percentage score of almost 60% on correctly reported verbs is quite good. The performance on the subject and objects classification is currently low. The issue is misclassification of the actors in the video and as a result reporting "other" as classification too often. Still, we showed a significant increase in the subject and object recognition scores. This increase can be attributed to a better understanding of the scene from the description generator.

The percentage score of the current action classifier is expected to improve further if we can train the action classifier on the description ground truth. The classification of the subject and objects in the description generator may be improved by adjusting the classifiers in visual processing and by relying more on world knowledge coded in rules in the RBS. Furthermore, it is preferred to reduce the number of track-breaks in the visual processing. In an embodiment multi-hypothesis tracking (MHT) may be used, as the current rule set is quite sensitive to track break errors. MHT is known per se. MHT allows a track to be updated by more than step for a next image in the video sequence, which results in multiple possible tracks. At each next image every possible track can be potentially updated with every new update. Thus each possible track at one image may branch into a plurality of possible tracks at the next image. MHT calculates probability values for of each of the possible tracks and typically only retains a set of possible tracks with higher probabilities than other tracks. We expect that use of more knowledge and MHT will significantly boost the recognition performance for the subject and objects.

A hybrid method has been presented to generate descriptions of video based on actions. The method includes an action classifier and a description generator. The aim for the action classifier is to detect and classify the actions in the video, such that they can be used as verbs for the description generator. The aim of the description generator is (1) to find the actors (objects or persons) in the video and connect these correctly to the verbs, such that these represent the subject, and direct and indirect objects, and (2) to generate a sentence based on the verb, subject, and direct and indirect objects. The novelty of our method is that we exploit the discriminative power of a bag-of-features action type detector with the generative power of a rule-based action descriptor. Shown is that this approach outperforms a homogeneous setup with the rule-based action type detector and action descriptor.

We argue that most events are characterized by multiple actions, and not a single one. A typical event is that one person approaches the other, walks up to the other person, and gives something. These actions, 'walk', 'approach', 'give' and 'receive', occur in a particular order, and are partially overlapping. Moreover, there are two persons in this event. In general, events may consist of multiple actions and performed by one or more persons. Such events are the topic of this paper.

Automated tagging of realistic video events has been considered. A method that produces textual descriptions was described. Text has the advantage that it is intuitive: the popularity of the Google search engine is that it enables a user to perform a text-based search. Our method produces descriptions that cover a wide range of events, they are not limited to a particular domain, and they are based on 48 generic human actions.

A contribution of our work is that we take advantage of the discriminative power of a set of bag-of-features action type detectors [11] to identify the subset of likely actions, and to subsequently describe them with a rule-based method that relates the actions to entities in the scene. Important aspects of our method are classification of actions, detection of actors, and connecting the actions to the relevant actors in the video. An actor can be a person or an object. The proposed method is a combination of an action classifier and a description generator.

Our method is part of a larger system in which objects in the scene are detected, tracked and their features are captured. This overall system is described in [12, 13] and it is summarized here.

Figure 4:
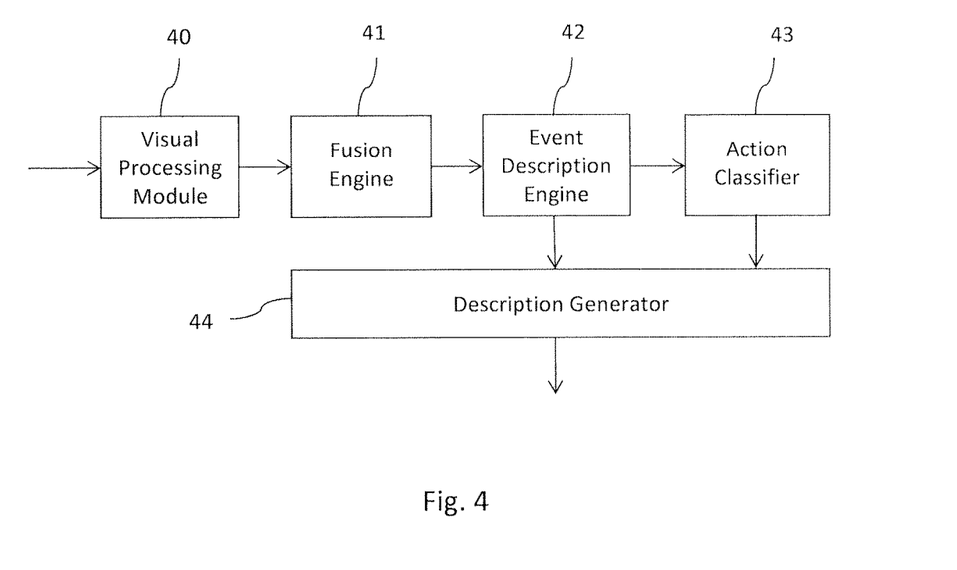
FIG. 4 shows building blocks of a description generation system

FIG. 4 shows the building blocks of an exemplary system for implementing description generation. The system comprises a visual processing module, a fusion engine, an event description generator, an action classifier, and the description generator processor.

The visual processing module 40 [ref 14] is configured to perform three steps. First the extraction of meaningful objects and their properties from video by (1) detection of moving objects [15], (2) object detection by a trained object detector for specific classes like persons and cars [16, 17], and (3) computation of other features of the objects (e.g. description of pose and body part movements) [18]. After detection the visual processing module combines items into tracks.

The fusion engine 41 [ref 19] filters and fuses tracked objects in order to form entities. In an embodiment only entities—a subset of the detected and tracked objects—are selected for further processing.

The event description engine 42 generates a more abstract description. From the low level object features, information at situation level [20] is created. There are three types of event properties:

1. Single-entity event properties, which describe properties of one entity (e.g. "the entity is moving fast").

2. Relations, properties about the relation between two entities (e.g. "the distance between two entities is decreasing").

3. Global properties of the scene, which present information about the scene that is not exclusively related to one or more entities (e.g. "there is only one entity present")

A belief value is assigned to each property.

The action classifier 43 assigns to all forty eight human actions a probability (see also [1]). We consider two types of action classifiers, which we have compared in our experiments. The first type is a discriminative bag-of-features classifier. The second type is a generative rule-based classifier.

The description generator 44 uses the events from the Event Description to build hypothesis about what happened in the video. The most likely hypotheses are selected based on the classified actions combined with the information from the hypothesis. The selected hypotheses connect the actions to entities and objects. If there are entities or objects that can be connected with the action, then a description is generated.

REFERENCES

1. DARPA: Hosting corpora suitable for research in visual activity recognition, in particular, the video corpora collected as part of DARPA's Mind's Eye program (2011), http://www.visint.org 2. Schüldt, C., Laptev, I., Caputo, B.: Recognizing human actions: A local svm approach. In: Proc. of ICPR, pp. 32-36 (2004)
3. Gorelick, L., Blank, M., Shechtman, E., Irani, M., Basri, R.: Actions as space-time shapes. IEEE Trans. Pattern Anal. Mach. Intell. 29, 2247-2253 (2007)
4. Ali, S., Shah, M.: Floor Fields for Tracking in High Density Crowd Scenes. In: Forsyth, D., Torr, P., Zisserman, A. (eds.) ECCV 2008, Part II. LNCS, vol. 5303, pp. 1-14. Springer, Heidelberg (2008)
5. Marszalek, M., Laptev, I., Schmid, C.: Actions in context. In: CVPR (2009)
6. Liu, J., Luo, J., Shah, M.: Recognizing realistic actions from videos "in the wild". In: CVPR (2009)
7. Gagnon, L.: Automatic detection of visual elements in films and description with a synthetic voice-application to video description. In: Proceedings of the 9th International Conference on Low Vision (2008)
8. Gupta, A., Srinivasan, P., Shi, J., Davis, L.: Understanding videos, constructing plots learning a visually grounded storyline model from annotated videos. In: IEEE Conference on Computer Vision and Pattern Recognition, CVPR 2009, pp. 2012-2019 (2009)
9. Kojima, A., Tamura, T., Fukunaga, K.: Natural language description of human activities from video images based on concept hierarchy of actions. International Journal of Computer Vision 50, 171-184 (2002)
10. Khan, M. U. G., Zhang, L., Gotoh, Y.: Towards coherent natural language description of video streams. In: ICCV Workshops, pp. 664-671. IEEE (2011)
11. Burghouts, G., Bouma, H., de Hollander, R., van den Broek, S., Schutte, K.: Recognition of 48 human behaviors from video. in Int. Symp. Optronics in Defense and Security, OPTRO (2012)
12. Ditzel, M., Kester, L., van den Broek, S.: System design for distributed adaptive observation systems. In: IEEE Int. Conf. Information Fusion (2011)
13. Bouma, H., Hanckmann, P., Marck, J.-W., Penning, L., den Hollander, R., ten Hove, J.-M., van den Broek, S., Schutte, K., Burghouts, G.: Automatic human action recognition in a scene from visual inputs. In: Proc. SPIE, vol. 8388 (2012)
14. Burghouts, G., den Hollander, R., Schutte, K., Marck, J., Landsmeer, S., Breejen, E.d.: Increasing the security at vital infrastructures: automated detection of deviant behaviors. In: Proc. SPIE, vol. 8019 (2011)
15. Withagen, P., Schutte, K., Groen, F.: Probabilistic classification between foreground objects and background. In: Proc. IEEE Int. Conf. Pattern Recognition, pp. 31-34 (2004)
16. Laptev, I.: Improving object detection with boosted histograms. Image and Vision Computing, 535-544 (2009)
17. Felzenszwalb, P., Girshick, R., McAllester, D., Ramanan, D.: Object detection with discriminatively trained part based models. IEEE Trans. Pattern Analysis and Machine Intelligence 32(9), 1627-1645 (2010)
18. Ferrari, V., Marin-Jimenez, M., Zisserman, A.: Progressive search space reduction for human pose estimation. In: IEEE Computer Vision and Pattern Recognition (2008)
19. van den Broek, S., Hanckmann, P., Ditzel, M.: Situation and threat assessment for urban scenarios in a distributed system. In: Proc. Int. Conf. Information Fusion (2011)
20. Steinberg, A. N., Bowman, C. L.: Rethinking the JDL data fusion levels. In: NSSDF Conference Proceedings (2004)
21. Burghouts, G., Schutte, K.: Correlations between 48 human actions improve their detection. In: ICPR 2012 (2012)
22. Breiman, L.: Random forests. Machine Learning 45, 1 (2001)
23. Guillaumin, M., Mensink, T., Verbeek, J., Schmid, C.: Tagprop: Discriminative metric learning in nearest neighbor models for image auto-annotation. In: ICCV (2009)
24. Klein, D., Manning, C. D.: Accurate unlexicalized parsing. In: Proceedings of the 41st Annual Meeting of the Association for Computational Linguistics, pp. 423-430 (2003)
25. The Stanford Natural Language Processing Group: The Stanford parser: A statistical parser (2003), http://nip.stanford.edu/software/lex-parser.shtml

The invention claimed is:

1. A video access system for generating a description of the video segment based on a predetermined set of action describing rules, each rule associated with a respective action type from a predetermined set of detectable action types, each of the rules in the set defining at least one role in the action, and based on predetermined conditions defined for the rules, for computing score values dependent on the attribute values of an object or objects assigned to the at least one role, the system comprising an action type detector coupled to a source of video data;
an object detector coupled to the source of video data;
a description generator coupled to the action type detector and the object detector, and configured to select a rule dependent on an action type detected from the video data for a video segment by the action type detector, the rule being selected from a predetermined set of rules;
assign detected objects, which have been detected from the video data for a video segment by the object detector, to the at least role of the selected rule;
compute score values for assignments of different detected objects to the role, each score value being computed dependent on the attribute values of the assigned object according to the predetermined conditions defined for the rule;
select a combination of the detected action type and at least one assigned detected objects on the basis of the score values;
generate a description of the video segment from the selected combination;

wherein the description generator is configured to compute score values as a function of score values generated for the action type by the action type detector and/or for the detected object by the object detector; and
wherein the description generator is configured to compute score values according to score value=$w0*R(A,t)+\text{Sum}\{w(i)*R(\text{condition},t(i))\}$ wherein the sum is taken over one or more conditions defined by the selected rule, "i" indexing the conditions, w0 and w(i) being predetermined weight factors, R(A,t) being a score value for an action type A at time t generated by the action type detector, R(condition, t(i)) being a score value or score values generated by the object detector for attribute values that are defined by the rule.

2. A video access system according to claim 1, the system comprising a data base for storing records associating identifications of video segments with descriptions,
a query processor configured to search the data base for descriptions that match a received query;

the description generator being configured to store the generated description in association with an identification of the video segment in the data base.

3. A video access system according to claim 1, comprising a query processor configured to compare the description with a predetermined query when the description is generated, and to activate a signal in response to detection that the description matches the query.

4. A video access system according to claim 1, wherein the description generator is configured to generate the description in the form of a string of text.

5. A video access system according to claim 1, wherein the description generator is configured to
assign combinations of the detected objects to a combination of roles defined by the selected rule;
compute the score values as a function of the attribute values of the assigned objects in the combination according to predetermined conditions defined for the rule;
select a combination of the detected action type and a combination of the detected objects on the basis of the score values;
generate a description of the video segment from the selected combination of the detected action type and a combination of the detected objects.

6. A video access system according to claim 1, wherein the description generator is configured to
select a plurality of rules dependent on a plurality of action types detected for the video segment;
select combinations of different ones of the detected action types and detected objects on the basis of the score values;
generate a plurality of descriptions of the video segment from the selected combinations.

7. A video access system according to claim 1, wherein the action type detector is configured to detect spatiotemporally localized image sequence features in the video segment; construct a histogram of feature values of the detected spatiotemporally localized image sequence features; and determine the detected action type based on a comparison of the histogram with reference histograms.

8. A video segment selection method, the method comprising
determining a detected action type for a video segment, and/or a likelihood value of the detected action type, the detected action type being selected from a predetermined set of action types dependent on features derived from the video segment;
determining detections and/or likelihood values for detected objects in the video segment and attribute values of the detected objects;
assigning the detected objects to a role defined in a predetermined rule associated with the detected action type;
computing score values for different assignments of detected objects to the role, each as a function of the attribute values of the assigned objects according to predetermined conditions defined for the rule wherein the score values are computed as a function of score values generated for the action type by the action type detector and/or for the detected object by the object detector, according to score value=$w0*R(A,t)+\text{Sum}\{w(i)*R(\text{condition},t(i))\}$ wherein the sum is taken over one or more conditions defined by the selected rule, "i" indexing the conditions, w0 and w(i) being predetermined weight factors, R(A,t) being a score value for an action type A at time t generated by the action type detector, R(condition, t(i)) being a score value or score values generated by the object detector for attribute values that are defined by the rule;
selecting a combination of the detected action type and the detected objects on the basis of the score values;
generating a description of the video segment from the selected combination.

9. A method according to claim 8, wherein the description is a textual description.

10. A method according to claim 8, determining a plurality of detected action types for the video segment, and/or likelihood values of the detected action types, the detected action types being selected from the predetermined set of action types;
assigning the detected objects to roles of respective predetermined rules associated with respective ones of the plurality of detected action types;
computing score values for different assignments of detected objects to the roles, each as a function of the attribute values of the assigned objects according to predetermined conditions defined for the respective predetermines rules;
selecting combinations of the detected action types and the detected objects on the basis of the score values;
generating a plurality of descriptions of the video segment from the selected combinations.

11. A method according to claim 8, wherein determining the detected action type comprises
detecting spatiotemporally localized image sequence features in the video segment;
constructing a histogram of feature values of the detected spatiotemporally localized image sequence features;
determining the detected action type based on a comparison of the histogram with reference histograms.

12. A non-transitory computer readable medium, comprising a program of machine executable instructions for a programmable computer system that, when executed by the programmable computer system, will cause the programmable computer system to execute the method of claim 7.

13. A video access system for generating a description of the video segment based on a predetermined set of action describing rules, each rule associated with a respective action type from a predetermined set of detectable action types, each of the rules in the set defining at least one role in the action, and based on predetermined conditions defined for the rules, for computing score values dependent on the attribute values of an object or objects assigned to the at least one role, the system comprising
an action type detector coupled to a source of video data;
an object detector coupled to the source of video data;
a description generator coupled to the action type detector and the object detector, and configured to
select a rule dependent on an action type detected from the video data for a video segment by the action type detector, the rule being selected from a predetermined set of rules;
assign detected objects, which have been detected from the video data for a video segment by the object detector, to the at least role of the selected rule;
compute score values for assignments of different detected objects to the role, each score value being computed dependent on the attribute values of the assigned object according to the predetermined conditions defined for the rule;
select a combination of the detected action type and at least one assigned detected object on the basis of the score values, dependent on whether the score value for the assignment of the at least one assigned detected object to the role is higher than the score value for the assignment of a further detected object to the role, or dependent on whether the score value for the assignment of the at least one assigned detected object to the role is higher than a predetermined threshold;

generate a description of the video segment from the selected combination wherein the predetermined set of rules comprises a rule that defines more than one role in the action type, the description generator being configured to assign respective ones of the detected objects to respective different ones of the roles of the selected rule when said rule that defines more than one role in the action type is selected dependent on the action type detected from the video data for the video segment.

* * * * *